J. C. SELLERS.
Rotary Cultivator.

No. 30,163.

Patented Sept. 25, 1860.

Witnesses:

Inventor:
J. C. Sellers
Munn & Co.
Attorneys.

UNITED STATES PATENT OFFICE.

J. C. SELLERS, OF WOODVILLE, MISSISSIPPI.

IMPROVEMENT IN COTTON-CULTIVATORS.

Specification forming part of Letters Patent No. 30,163, dated September 25, 1860.

*To all whom it may concern:*

Be it known that I, J. C. SELLERS, of Woodville, in the county of Wilkinson and State of Mississippi, have invented a new and useful Improvement in Cotton-Thinning Hoes; and I do hereby declare that the following is a full, clear, and exact description of the same, reference being had to the accompanying drawings, forming a part of this specification, in which—

Figure 1:
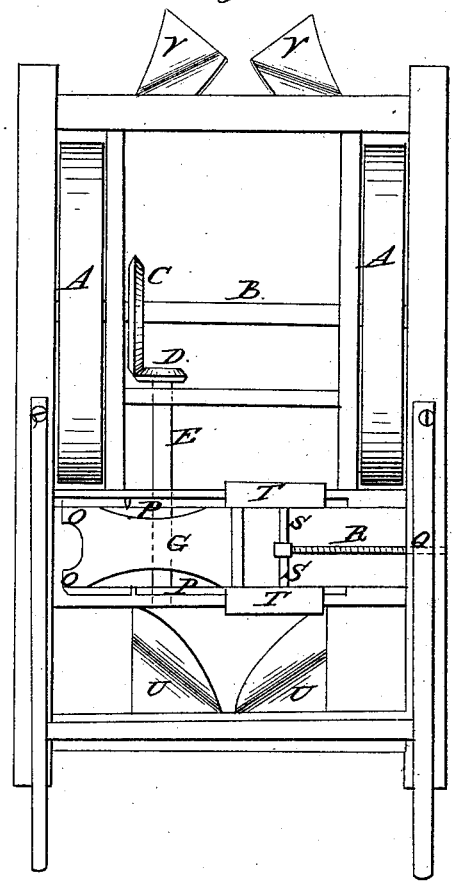
Figure 2:
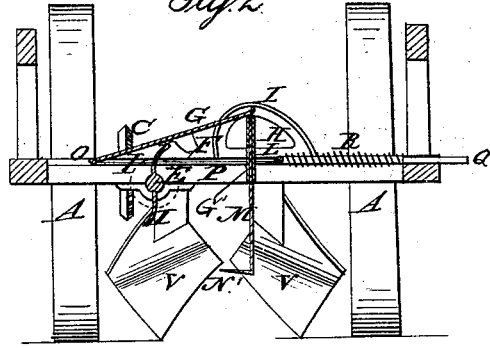

Figure 1 represents a plan, and Fig. 2 a vertical cross-section, of the implement.

Similar letters of reference in each of the several figures indicate corresponding parts.

The nature of my invention consists in the arrangement of a reciprocating hoe-frame and cam-grooves, in combination with an independent revolving shaft, plowshares, and coverers of a cotton-thinning plow, all constructed as hereinafter to be described.

To enable others skilled in the art to make and use my invention, I will proceed to describe its construction and operation.

The frame of the implement is supported upon two driving-wheels, A A. Plowshares V V are secured to the front, and coverers U U to the rear, end of the frame. An independent shaft, E, is geared to the main shaft B by means of bevel-wheels D C.

The bent frame or plate G G', to which is screwed shank M of the hoe N, is, at O O, hung to one end of a frame, P P S, sliding in horizontal guideways in the main frame of the implement. At the angle formed by the two parts G G' the plate G G' is provided with two pivots, J, one at each side. These pivots are guided in cam-grooves H L in two brackets, T T, extending from the main frame of the machine. The lower part, L, of the groove is horizontal, while the upper part, H, is of a shape approximating a semicircle. A rod, Q, extending from the part S of frame P P S, is surrounded with a spiral spring, R, pressing the frame P P S in one direction. As the shaft E revolves one or more wings, I, projecting from said shaft, come successively in contact with a dog, F, on the under side of plate G, and move the plate forward against the tendency of spring R, and at the same time lift it upward so that the pivots J travel through the curved and elevated portion H of the cam-groove. By the time the pivots have arrived at the other end of the curved part of the cam-groove the wing I slips off the dog F and the plate G is allowed to return in obedience to the tendency of the spring R. During this return motion the plate G is in a horizontal position, the pivots J traveling through the horizontal part L of the cam-groove. The plate is then again ready to be moved forward by the next wing I.

The object of this arrangement is to alternately lift the hoe N over the hills and then to let it cut through the hill, so as to dig out alternate plants, as it is necessary in the operation of thinning cotton. In this manner it will be seen that the hoe rises slowly over the hills and returns with a quick motion, considerably facilitating the cutting out of the plants.

Of course the hoe is so arranged as to reciprocate and cut across the path of the plowshares V V and coverers U U.

What I claim as my invention, and desire to secure by Letters Patent, is—

The arrangement of a reciprocating spring hoe-frame, N M G, and cam-grooves L H, in combination with an independent revolving shaft, E, and with the plowshares V V and coverers U U of a cotton-thinning plow, substantially as and for the purposes set forth.

J. C. SELLERS.

Witnesses:
GOODWIN Y. AT LEE,
R. W. FENWICK.